United States Patent
Kuwahara et al.

(10) Patent No.: US 9,869,353 B2
(45) Date of Patent: Jan. 16, 2018

(54) CLUTCH HYDRAULIC SYSTEM FOR VEHICLE

(71) Applicant: Nissan Motor Co., Ltd., Yokohama-shi, Kanagawa (JP)

(72) Inventors: Takashi Kuwahara, Kanagawa (JP); Shigeru Ishii, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 135 days.

(21) Appl. No.: 14/896,674

(22) PCT Filed: Jun. 18, 2014

(86) PCT No.: PCT/JP2014/066161
§ 371 (c)(1),
(2) Date: Dec. 8, 2015

(87) PCT Pub. No.: WO2015/001959
PCT Pub. Date: Jan. 8, 2015

(65) Prior Publication Data
US 2016/0146270 A1  May 26, 2016

(30) Foreign Application Priority Data
Jul. 2, 2013  (JP) ................ 2013-138601

(51) Int. Cl.
*F16D 48/02* (2006.01)
*F16D 25/12* (2006.01)
*F16H 61/00* (2006.01)

(52) U.S. Cl.
CPC ........... *F16D 48/02* (2013.01); *F16D 25/123* (2013.01); *F16D 25/14* (2013.01); *F16H 61/0031* (2013.01); *F16D 2048/0236* (2013.01); *F16D 2048/0239* (2013.01); *F16D 2048/0245* (2013.01); *F16D 2048/0269* (2013.01);
(Continued)

(58) Field of Classification Search
CPC ........ F16D 25/14; F16D 25/123; F16D 48/02; F16D 2048/0236; F16D 2048/0239; F16D 2048/0245; F16D 2500/1088; F16D 2500/30404; F16D 2500/70448;
(Continued)

(56) References Cited

U.S. PATENT DOCUMENTS 4,219,109 A    8/1980  Ushijima et al.
2003/0047410 A1  3/2003  Busold et al.
(Continued)

FOREIGN PATENT DOCUMENTS

DE   10 2011 089 751 A1   6/2013
EP       0 316 869 A2     5/1989
(Continued)

*Primary Examiner* — Richard M Lorence
(74) *Attorney, Agent, or Firm* — Global IP Counselors, LLP

(57) ABSTRACT

A vehicle clutch hydraulic system for a vehicle is provided with a mechanical oil pump, an electric oil pump, a forward clutch and a control valve unit. In the vehicle clutch hydraulic system, a main pump oil passage fluidly connects the mechanical oil pump to the control valve unit. A sub-pump oil passage fluidly connects the electric oil pump to a forward clutch oil passage into which an oil passage outlet opens at an inside location closer to a clutch rotational axis than a clutch oil chamber of the forward clutch.

10 Claims, 4 Drawing Sheets

(52) U.S. Cl.
CPC ............... *F16D 2500/1088* (2013.01); *F16D 2500/30404* (2013.01); *F16D 2500/70448* (2013.01)

(58) Field of Classification Search
CPC ....... F16H 61/0031; B60K 6/387; B60K 6/48; B60K 2006/4825; Y02T 10/6221
See application file for complete search history.

(56) References Cited

U.S. PATENT DOCUMENTS

| | | | |
|---|---|---|---|
| 2010/0311538 A1* | 12/2010 | Miyabe et al. | F16H 61/0031 477/2 |
| 2012/0217122 A1* | 8/2012 | Kasuya et al. | B60K 6/387 192/113.35 |
| 2013/0075217 A1 | 3/2013 | Seo et al. | |

FOREIGN PATENT DOCUMENTS

| | | |
|---|---|---|
| EP | 1 722 121 A1 | 11/2006 |
| FR | 2 829 541 A1 | 3/2003 |
| JP | 2012-82951 A | 4/2012 |

\* cited by examiner

CLUTCH HYDRAULIC SYSTEM FOR VEHICLE

CROSS-REFERENCE TO RELATED APPLICATIONS

This application is a U.S. National stage application of International Application No. PCT/JP2014/066161, filed Jun. 18, 2014, which claims priority to Japanese Patent Application No. 2013-138601 filed in Japan on Jul. 2, 2013. The entire disclosure of Japanese Patent Application No. 2013-138601 is hereby incorporated herein by reference.

BACKGROUND

Field of the Invention

The present invention relates to a clutch hydraulic system for a vehicle equipped with two oil pumps, a mechanical oil pump and an electric oil pump, as a hydraulic power source.

Background Information

Conventionally, a clutch hydraulic system for a vehicle in which a main pump oil passage and a sub-pump oil passage are merged and connected to a control valve unit via a common oil passage is known (refer to, for example, Japanese Laid Open Patent Application No. 2012-82951).

SUMMARY

However, a conventional clutch hydraulic system for a vehicle is configured so that a main pump oil passage and a sub-pump oil passage are merged and connected to a control valve unit via a common oil passage. Consequently, there is a problem in that a check valve needs to be disposed in each pump oil passage as a backflow prevention mechanism for preventing oil from flowing back into the other pump, while one pump among a mechanical oil pump and an electric oil pump is in operation.

In view of the problem described above, an object of the present invention is to provide a clutch hydraulic system for a vehicle capable of eliminating the need to provide a backflow prevention mechanism, when installing two oil pumps as a hydraulic power source.

In order to achieve the object above, the present invention comprises a mechanical oil pump, an electric oil pump, a clutch, and a control valve unit. In this clutch hydraulic system for a vehicle, a main pump oil passage leading from the mechanical oil pump is connected to the control valve unit. A sub-pump oil passage leading from the electric oil pump is connected to a clutch oil passage into which an oil passage outlet opens at an inside location closer to the clutch rotational axis than the clutch oil chamber of the clutch.

Therefore, a main pump oil passage leading from the mechanical oil pump is connected to the control valve unit. On the other hand, a sub-pump oil passage leading from the electric oil pump is connected to a clutch oil passage into which an oil passage outlet opens at an inside location closer to the clutch rotational axis than the clutch oil chamber of the clutch. In other words, when a main pump oil passage and a sub-pump oil passage are merged and connected to a control valve unit via a common oil passage, a backflow prevention mechanism is installed in each pump oil passage. In contrast, by connecting only the main pump oil passage to the control valve unit, and connecting the sub-pump oil passage directly to the clutch oil passage, installing a backflow prevention mechanism becomes unnecessary. The reason for this is as follows: by having an oil passage outlet of the clutch oil passage opened at an inside location closer to the clutch rotational axis than the clutch oil chamber of the clutch, a rotating clutch is positioned on the outer diameter side of the outlet of the sub-pump oil passage. Accordingly, the oil passage outlet of the clutch oil passage is placed under a negative pressure due to the centrifugal pump effect caused by the rotation of the clutch, and a suction force for suctioning oil from the clutch oil passage acts to prevent backflow to the pump side. As a result, the need to provide a backflow prevention mechanism can be eliminated, while installing two oil pumps as a hydraulic power source.

BRIEF DESCRIPTION OF THE DRAWINGS

Referring now to the attached drawings which form a part of this original disclosure.

DETAILED DESCRIPTION OF THE EMBODIMENTS

Figure 1:
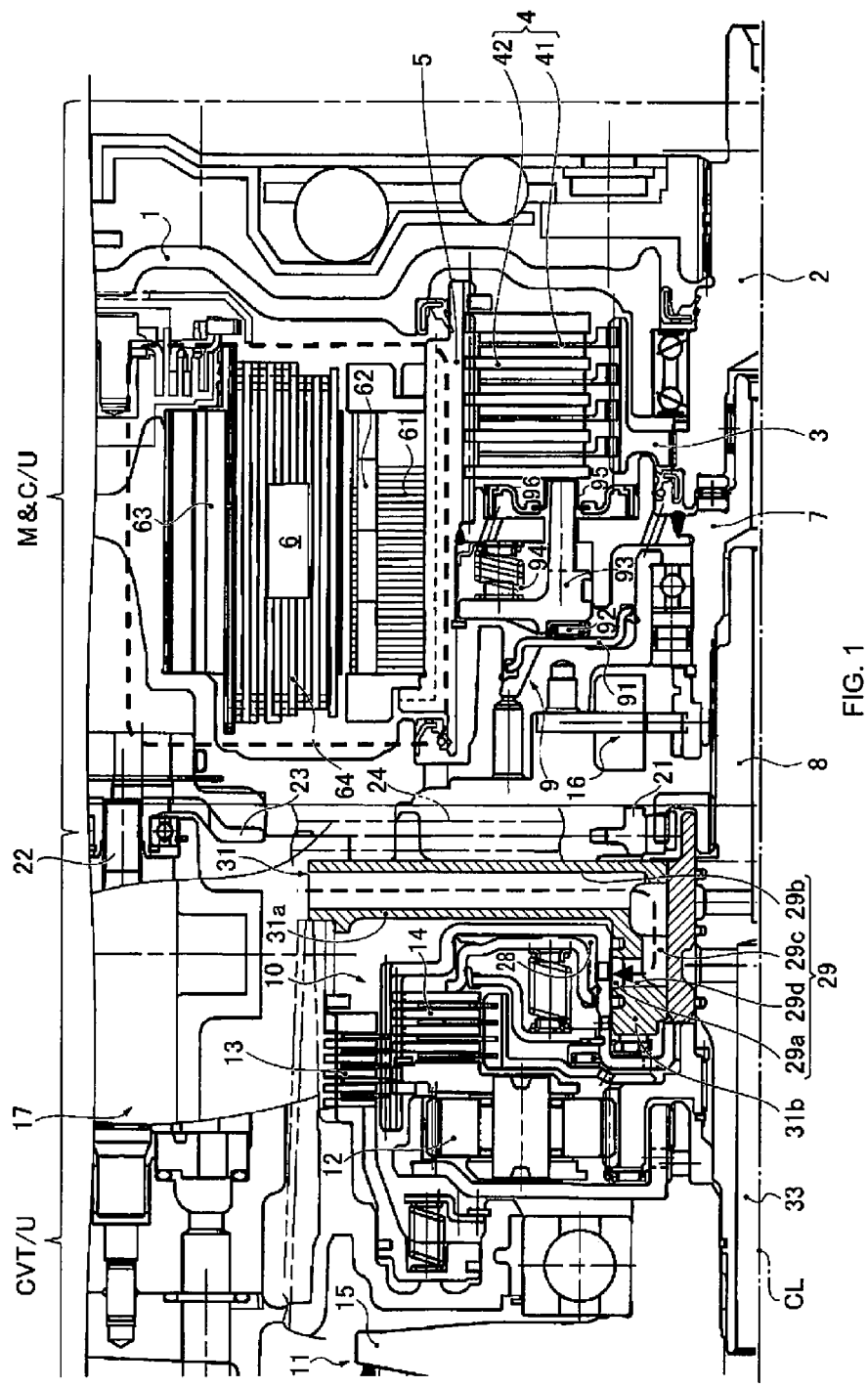
FIG. 1 is a schematic diagram illustrating an FF-hybrid drive system to which is applied the clutch hydraulic system for a vehicle in accordance with a first embodiment.

Preferred embodiments for realizing the clutch hydraulic system for a vehicle of the present invention are explained below based on the first embodiment illustrated in the drawings.

First Embodiment

The configuration is described first. The "overall structure," "configuration of the clutch hydraulic system for a vehicle," and the "configuration of the hydraulic power source control" will be described separately with regard to the configuration of the clutch hydraulic system for a vehicle of the first embodiment.

Overall Structure

FIG. 1 illustrates an FF-hybrid drive system to which is applied the clutch hydraulic system for a vehicle. The overall structure of the FF-hybrid drive system is described below, based on FIG. 1.

The FF-hybrid drive system is configured from an unillustrated engine, a motor & clutch unit M&C/U, and a continuously variable transmission unit CVT/U, as illustrated in FIG. 1. The system further comprises a unit case 1, an engine connecting shaft 2, a clutch hub 3, a dry multi-plate clutch 4, a rotor & clutch drum 5, a motor/generator 6, a rotor shaft 7, a transmission input shaft 8, and a clutch hydraulic actuator 9. This FF-hybrid drive system has a configuration known as one-motor (motor/generator 6) two-clutch (a first clutch CL1, a second clutch CL2), in which an "electric vehicle mode (EV mode)" or a "hybrid vehicle mode (HEV mode)" can be selected as the drive mode. That is, by disengaging the dry multi-plate clutch 4 (corresponding to the first clutch CL1), the "EV mode" is selected and the motor/generator 6 and the transmission input shaft 8 are connected via the rotor & clutch drum 5 and the rotor shaft 7. By engaging the dry multi-plate clutch 4 (corresponding to first clutch CL1), the "HEV mode" is selected and an engine, not shown in the drawings, and the motor/generator 6 are connected via the dry multi-plate clutch 4.

The motor & clutch unit M&C/U comprises, housed in the unit case 1 and sandwiching the rotor & clutch drum 5, a dry multi-plate clutch 4 disposed on the engine side, a motor/generator 6 disposed on the drum outer perimeter side, and a clutch hydraulic actuator 9 disposed on the transmission side. That is, the rotor & clutch drum 5 have the function of partitioning the space inside the unit case 1 into three spaces: a first dry space for disposing the dry multi-plate clutch 4, a second dry space for disposing the motor/generator 6, and a wet space for disposing the clutch hydraulic actuator 9.

The dry multi-plate clutch 4 is intended for connecting/disconnecting the drive power transmission leading from an unillustrated engine. This dry multi-plate clutch 4 is a normally open clutch configured by alternately arranging a drive plate 41, which is splined to the clutch hub 3, and a driven plate 42, which is splined to the rotor & clutch drum 5.

The motor/generator 6 is configured by a synchronous AC motor, and is disposed on the outer perimeter position of the rotor & clutch drum 5. This motor/generator 6 comprises a rotor 61, which is supported and fixed to the outer perimeter surface of the rotor & clutch drum 5, and a permanent magnet 62, which is disposed so as to be embedded in the rotor 61. The motor/generator further comprises a stator 63, which is fixed to the unit case 1 and disposed relative to the rotor 61 so as to have an air gap therebetween, and a stator coil 64 which is wound on the stator 63.

The clutch hydraulic actuator 9 hydraulically controls the engagement/disengagement of the dry multi-plate clutch 4. This clutch hydraulic actuator 9 comprises a piston 91, a needle bearing 92, a piston arm 93, which extends through the rotor & clutch drum 5 in a plurality of locations, a return spring 94, an arm press-plate 95, and a bellows elastic support member 96.

The continuously variable transmission unit CVT/U is coupled to the motor & clutch unit M&C/U, and comprises a forward/reverse switching mechanism 10 and a V-belt type continuously variable transmission mechanism 11. The forward/reverse switching mechanism 10 comprises a planetary gear 12, a reverse brake 13 (corresponding to the second clutch CL2 in the R-range), and a forward clutch 14 (corresponding to the second clutch CL2 in the D-range); the mechanism reverses the direction and decelerates the rotation leading from the transmission input shaft 8 and transmits same to a primary pulley 15 by engaging the reverse brake 13. Then, the mechanism directly connects the transmission input shaft 8 and the primary pulley 15 by engaging the forward clutch 14. The V-belt type continuously variable transmission mechanism 11 achieves a stepless transmission ratio by bridging a V-belt between the primary pulley 15 and a secondary pulley, not shown in the drawings, and by changing the belt contact diameter by controlling the primary pulley pressure and the secondary pulley pressure. In FIG. 1, a resolver 16 is configured by a rotor and a stator for detecting the rotational position of the motor/generator 6.

Configuration of the Clutch Hydraulic System for a Vehicle

Figure 2:
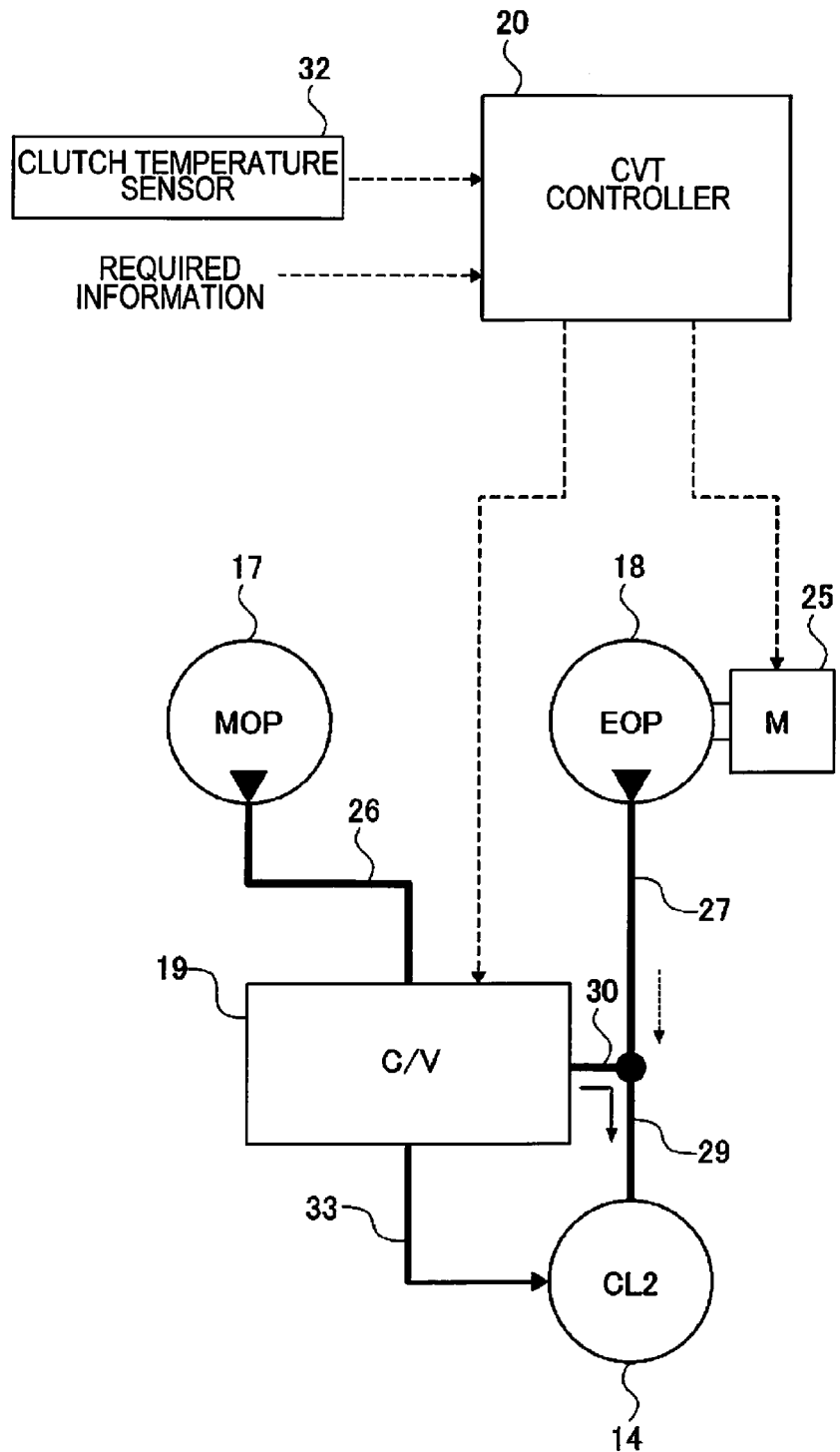
FIG. 2 is a system configuration diagram illustrating the clutch hydraulic system for the vehicle of the first embodiment.

FIG. 2 illustrates the clutch hydraulic system for a vehicle of the first embodiment. The configuration of the clutch hydraulic system for a vehicle will be described below, based on FIG. 1 and FIG. 2.

The clutch hydraulic system for a vehicle of the first embodiment comprises a mechanical oil pump 17, an electric oil pump 18, a forward clutch 14 (clutch), a control valve unit 19, and a CVT controller 20 (clutch cooling control means).

The mechanical oil pump 17 is an oil pump which is operated by the transmission input shaft 8 (rotary drive shaft) of the FF-hybrid drive system via a chain drive mechanism. This chain drive mechanism comprises a drive-side sprocket 21 provided on the transmission input shaft 8 side, a driven sprocket 23 provided to a pump shaft 22, and a chain 24 which is bridged between the two sprockets 21, 23, as illustrated in FIG. 1.

The electric oil pump 18 is an oil pump that is operated by an electric motor 25 independent of the mechanical oil pump 17. This electric oil pump 18 is disposed in a direction above the sheet in FIG. 1, and therefore is not illustrated.

The forward clutch 14 is provided to the drive system having a pump discharge pressure leading from the mechanical oil pump 17 as a hydraulic power source, and carried out a full engagement operation/slip engagement operation/disengagement operation via the control oil pressure from the control valve unit 19. The clutch is also one that is cooled by the hydraulic oil that is discharged from the electric oil pump 18.

The control valve unit 19 regulates the pump discharge pressure leading from the mechanical oil pump 17 to a line pressure by a regulator valve, and creates an engagement/disengagement oil pressure and lubricating oil pressure to the forward clutch 14 with the line pressure as the source pressure. In addition to the control oil pressure to the forward clutch 14, the control valve unit 19 also creates control oil pressure to the dry multi-plate clutch 4, control oil pressure to the reverse brake 13, control oil pressure to the primary pulley 15, and control oil pressure to an unillustrated secondary pulley.

The main pump oil passage 26 leading from the mechanical oil pump 17 is connected to the control valve unit 19, as illustrated in FIG. 2.

The sub-pump oil passage 27 leading from the electric oil pump 18 is connected to a forward clutch oil passage 29 (clutch oil passage) into which an oil passage outlet 29a opens at an inside location closer to the clutch rotational axis CL than the clutch oil chamber 28 of the forward clutch 14, as illustrated in FIG. 1. This sub-pump oil passage 27 is connected to an output oil passage 30 leading from the control valve unit 19, and the forward clutch oil passage 29 is connected on the downstream side of the connection position of the two oil passages of the sub-pump oil passage 27 and the output oil passage 30, as illustrated in FIG. 2.

The forward clutch oil passage 29 is formed on a fixing plate member 31 as an L-shaped plate member comprising a radial plate portion 31a that is disposed in a side position of the forward clutch 14, and an axial extension portion 31b that enters an interior region of the forward clutch 14 from the clutch rotational axis CL side end of the radial plate portion 31a, as illustrated in FIG. 1. This fixing plate member 31 is fixed to the transmission case, and maintains the fixed state regardless of the rotation of the transmission input shaft 8 and the forward clutch 14 of the FF-hybrid drive system.

The forward clutch oil passage 29 is formed on the fixing plate member 31 and comprises a first radial oil passage portion 29b to which the sub-pump oil passage 27 is connected, an axial oil passage portion 29c extending in the axial direction from the clutch rotational axis CL side end of the first radial oil passage portion 29b, and a second radial oil passage portion 29d extending from the axial oil passage portion 29c in the outer diameter direction, and into which an oil passage outlet 29a opens. In FIG. 1 and FIG. 2 a lubricating oil passage 33 is provided in which lubricating oil is ejected in the radial direction from an axial oil passage.

The CVT controller 20 actuates the electric motor 25 of the electric oil pump 18, when the forward clutch temperature detected by a clutch temperature sensor 32 (clutch temperature detection means) is at a predetermined temperature or higher. Various hydraulic controls in the control valve unit 19 are also carried out based on control commands from the CVT controller 20.

Configuration of the Hydraulic Power Source Control

Figure 3:
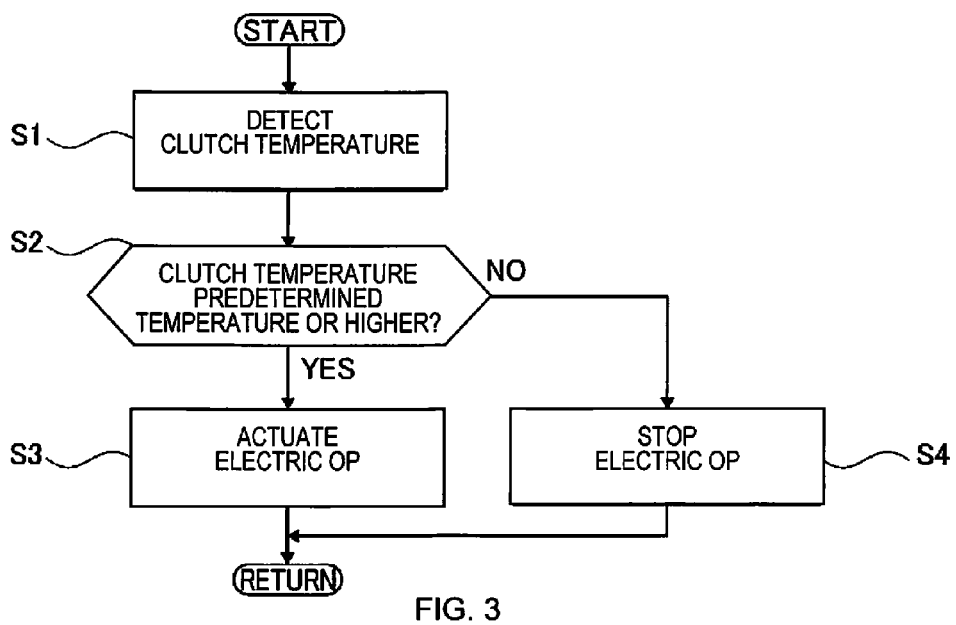
FIG. 3 is a flowchart illustrating a hydraulic power source control process which is executed in a CVT controller of the clutch hydraulic system for the vehicle of the first embodiment.

FIG. 3 illustrates the flow of a hydraulic power source control process, which is carried out in the CVT controller 20 of the clutch hydraulic system for a vehicle of the first embodiment. Each of the steps in FIG. 3, which represent the configuration of the hydraulic power source control, will be described below. This process is carried out repeatedly at predetermined time intervals.

In step S1, the temperature of the forward clutch 14 is detected by the clutch temperature sensor 32, and the process proceeds to step S2.

In step S2, following the clutch temperature detection in step S1, a determination is made as to whether or not the forward clutch temperature is at a predetermined temperature or higher. In the case of YES (forward clutch temperature≥predetermined temperature) the process proceeds to step S3, and in the case of NO (forward clutch temperature<predetermined temperature) the process proceeds to step S4. Here, the "predetermined temperature" is set to a temperature threshold at which the temperature of the forward clutch 14 must be kept from rising to a temperature at which clutch deterioration progresses by way of an oil cooling effect, for example in a state in which the forward clutch 14 is generating heat due to frictional heat during slip engagement.

In step S3, following the determination in step S2 that the forward clutch temperature≥predetermined temperature, the electric motor 25 of the electric oil pump 18 is actuated, and the process proceeds to RETURN. Here, the actuation of the electric motor 25 is performed by an output of a motor operation command which ensures the cooling oil amount of at least the forward clutch 14 in the electric oil pump 18. The motor operation command may be a fixed command value, or a variable command value which takes into consideration the temperature rise change, etc., of the forward clutch 14.

In step S4, following the determination in step S2 that the forward clutch temperature<predetermined temperature, the electric motor 25 of the electric oil pump 18 is stopped, and the process proceeds to RETURN.

Next, the effects are described. The "technical background," "problems of the comparative examples," "reduction effect of the backflow prevention mechanism," and "oil cooling effect of the forward clutch" will be separately described regarding the effects of the clutch hydraulic system for a vehicle of the first embodiment.

Technical Background

The present application is an invention relating to a hydraulic system of a second clutch CL2, in particular to the cooling of the second clutch CL2, provided to an FF-hybrid drive system (one-motor two-clutch). This FF-hybrid drive system is not equipped with a torque converter having a rotational difference absorption function, but instead is provided with a dry multi-plate clutch (corresponding to the first clutch CL1), as a starting element. Accordingly, when desiring to increase the axle torque while substantially fixing the rotational frequency of the axle, such as when starting on a slope, in order to obtain the required torque, the rotational difference between the high input rotational frequency (engine+motor) and the low axle rotational frequency is filled by slip engagement in which the clutch is allowed to slip in a half-clutch state.

Here, since a dry multi-plate clutch is used as the first clutch CL1, the half-clutch state cannot be maintained for a long time. Consequently, the second clutch CL2, which is a wet clutch, is mainly responsible for the slip engagement. In addition, the mechanical oil pump is driven by the rotation of the transmission input shaft, but the rotation does not reach a very high speed in a situation such as starting on a hill, so the amount of pump oil is limited, thus creating a durability problem for the second clutch CL2. On the other hand, the second clutch CL2 generates heat due to slippage, so cooling by applying oil is desired. Therefore, in order to solve the contradicting problem that the oil quantity cannot be secured but cooling the second clutch CL2 with oil is desired, a measure was taken to supplement the amount of oil by providing an electric oil pump.

In contrast, in the case where the "EV mode" is often used, and when it is desirable to ensure complete provision of the hydraulic pressure, even if the transmission input shaft has stopped, a mechanical oil pump and a large electric oil pump are provided as a countermeasure. However, in the case where the "EV mode" is used in a limited manner, basically, since the engine is operating, the rotation of the mechanical oil pump also reaches a relatively high speed, so the required oil quantity can be quickly secured. In addition, besides the above, even if the engine is stopped when the vehicle is stopped, the oil quantity can be ensured by the motor maintaining the equivalent of idling rotation; therefore, the need of the electric oil pump becomes less than that of a case in which the "EV mode" is often used.

However, in order to solve the problem of wanting to cool the second clutch CL2 with oil in a situation in which the amount of oil cannot be secured such as during starting on a hill, the amount of oil from the mechanical oil pump is insufficient, thus using an electric oil pump is essential. In this case, when taking care to ensure that the amount of cooling oil for the second clutch CL2 is sufficient, the cost disadvantage can be avoided by using a small electric oil pump. Furthermore, the desire to reduce costs by eliminating check valves from the hydraulic circuit is the technical background of the present invention.

Problems of the Comparative Examples

Figure 4:
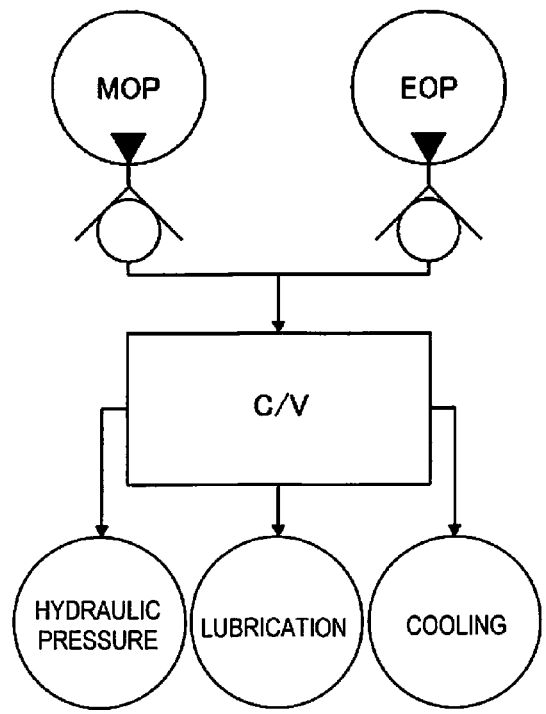
FIG. 4 is a system configuration diagram illustrating the clutch hydraulic system for a vehicle of a comparative example.

A Comparative Example shall be that of a clutch hydraulic system for a vehicle configured by merging a main pump oil passage leading from a mechanical oil pump (MOP) and a sub-pump oil passage leading from an electric oil pump (EOP), which is then connected to a control valve unit (C/V) via a common oil passage (FIG. 4).

In the case of this Comparative Example, a check valve needs to be disposed in each pump oil passage as a backflow prevention mechanism, in order to prevent oil from flowing back into the other pump, while one pump among the mechanical oil pump (MOP) and the electric oil pump (EOP) is in operation, as illustrated in FIG. 4.

That is, while the mechanical oil pump can generate high hydraulic pressure, the rotation thereof at the time of start is not very high, and the hydraulic pressure (oil amount) that is supplied to the clutch is limited by a regulator valve or the like and thus is low; therefore, the hydraulic pressure on the mechanical oil pump circuit side is by no means high. Consequently, if the electric oil pump is actuated, there is the risk that hydraulic pressure from the electric oil pump will exceed the hydraulic pressure from the mechanical oil pump thus causing a backflow. Therefore, check valves are provided so that when the hydraulic pressure of the electric oil pump exceeds that of the mechanical oil pump, the supply is switched from the mechanical oil pump circuit to the electric oil pump, in order to prevent insufficient cooling liquid as well as fluctuations in the hydraulic pressure of the mechanical oil pump hydraulic circuit that are caused by backflow.

In the case of the clutch hydraulic system for a vehicle of the Comparative Example, since the configuration is one in which a check valve is disposed in each of the pump oil passages as a backflow prevention mechanism, there are the following additional problems.

(a) Since the check valve becomes a piping resistance, the structure (size, capacity) of the mechanical oil pump and the electric oil pump must be increased.

(b) Depending on the balance state of the oil flow, chattering is generated in the check valves. For example, if the electric oil pump is operated in a state in which there is residual hydraulic pressure from the mechanical oil pump, pressure will achieve balance near the valve opening pressure of the check valve, generating oil vibration due to the opening and closing.

Reduction Effect of the Backflow Prevention Mechanism

As described above, eliminating check valves installed in the respective pump oil passages of the mechanical oil pump and the electric oil pump is preferable from the perspective of increasing the cost advantage. The reduction effect of the backflow prevention mechanism, which reflects the above preference, is described below, based on FIG. 5 and FIG. 6.

In the first embodiment, the main pump oil passage 26 leading from the mechanical oil pump 17 is connected to the control valve unit 19. On the other hand, a sub-pump oil passage 27 leading from the electric oil pump 18 is connected to a forward clutch oil passage 29 into which an oil passage outlet 29a opens at an inside location closer to the clutch rotational axis CL than the clutch oil chamber 28 of the forward clutch 14.

Figure 5:
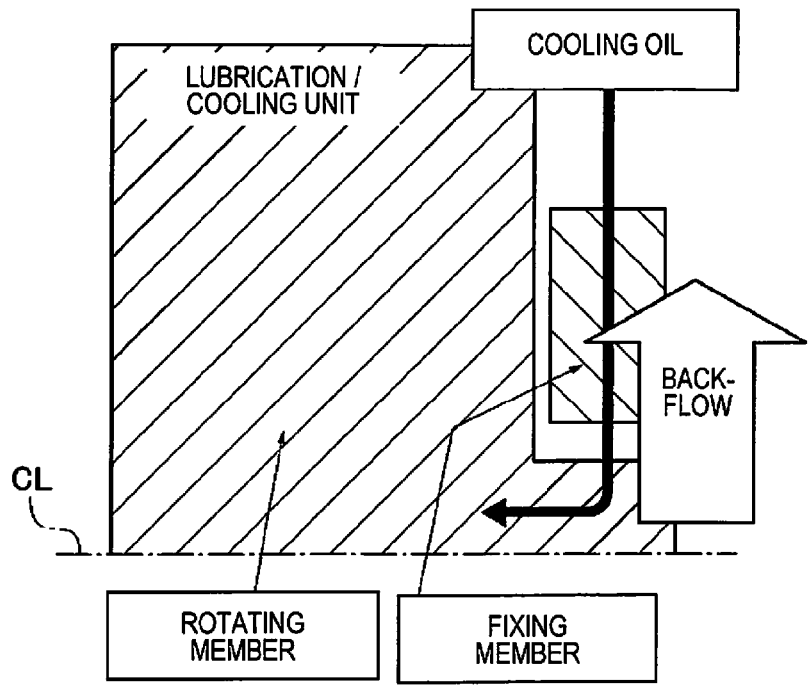
FIG. 5 is an explanatory diagram of the oil supply operation, illustrating an operation for supplying oil to a forward clutch in an inner diameter direction toward a clutch rotational axis, in the clutch hydraulic system for the vehicle.

That is, by connecting only the main pump oil passage 26 to the control valve unit 19, and connecting the sub-pump oil passage 27 directly to the forward clutch oil passage 29, it becomes unnecessary to install a backflow prevention mechanism. The reasons are explained. First, if oil is supplied to a rotating member such as the forward clutch in the inner diameter direction toward the clutch rotational axis CL, a force in the backflow direction, which is the opposite direction of the oil supply direction, acts on the forward clutch oil passage, due to the centrifugal pump effect from the axial center portion of the rotating member, as illustrated in FIG. 5.

Figure 6:
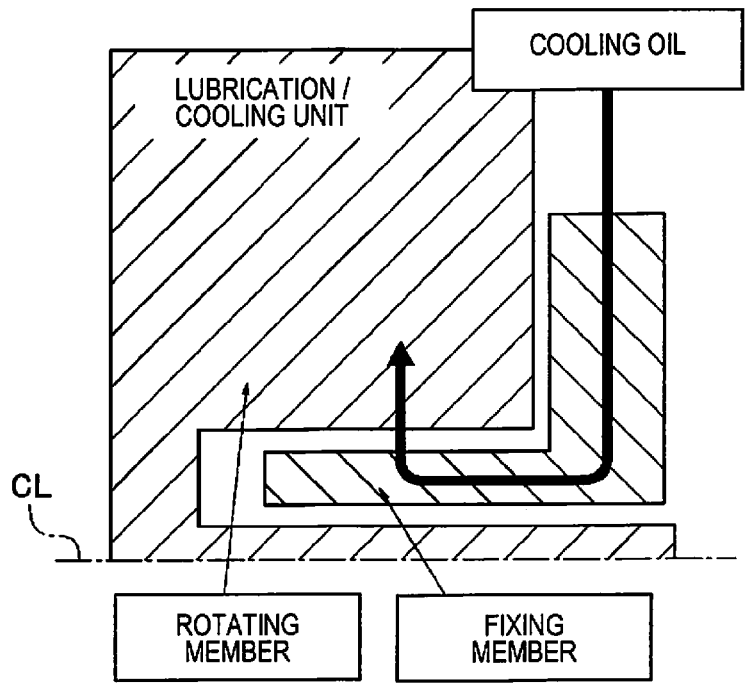
FIG. 6 is an explanatory diagram of the oil supply operation, illustrating an operation for supplying oil to a forward clutch in an outer diameter direction away from the clutch rotational axis, in the clutch hydraulic system for the vehicle of the first embodiment.

In contrast, in the first embodiment, by having an oil passage outlet 29a of the clutch oil passage 29 open at an inside location closer to the clutch rotational axis CL than the clutch oil chamber 28 of the forward clutch 14, a rotating forward clutch 14 is positioned on the outer diameter side of the outlet of the sub-pump oil passage 27. In this manner, if oil is supplied to the forward clutch 14, which is a rotating member, in the outer diameter direction away from the clutch rotational axis CL2, the oil passage outlet 29a of the forward clutch oil passage 29 is placed under a negative pressure due to the centrifugal pump effect caused by the rotation of the forward clutch 14, and a suction force for the forward clutch 14 to suction oil from the forward clutch oil passage 29 acts so as to prevent backflow to the pump side, as illustrated in FIG. 6.

Normally, if all that is required is to apply cooling oil to the clutch, injection (applying oil) using the pumping force of the pump is simple, easy, and allows disposing an oil passage anywhere. However, when limited to the cooling portion of the forward clutch 14, an arrangement is made so that the centrifugal pump effect is caused by the rotation of the forward clutch 14. That is, as long as the forward clutch 14 is rotating, a negative pressure state exists around the forward clutch 14; therefore, the mode is one in which the axial portion acts as an oil reservoir, and oil is suctioned from the forward clutch oil passage 29.

As a result, the need to provide a backflow prevention mechanism can be eliminated, while installing the mechanical oil pump 17 and the electric oil pump 18 as a hydraulic power source.

In the first embodiment, the sub-pump oil passage 27 leading from the electric oil pump 18 is connected to the output oil passage 30 leading from the control valve unit 19, and the forward clutch oil passage 29 is connected on the downstream side of the connection position of the two oil passages 27, 30 (FIG. 2). For example, in the case where the slip engagement pressure is outputted from the output oil passage 30 by the operation of the mechanical oil pump 17, the slip engagement pressure is lower than the pump discharge pressure. Then, a negative pressure suction force due to the centrifugal pump effect operates in the forward clutch oil passage 29. Therefore, a flow toward the outlet side of the forward clutch oil passage 29 can be ensured by preventing backflow to the side with the electric oil pump 18, whether the electric oil pump 18 is being operated or is stopped.

In the first embodiment, the forward clutch oil passage 29 is formed on a fixing plate member 31 having an L-shaped cross-section, comprising a radial plate portion 31a disposed in a side position of the forward clutch 14, and an axial extension portion 31b, which enters an interior region of the forward clutch 14 from the clutch rotational axis CL side end of the radial plate portion 31a (FIG. 1). In other words, in the case of opening an oil passage outlet 29a of the forward clutch oil passage 29 at an inside location of the clutch oil chamber 28, if the forward clutch oil passage 29 is formed on the clutch rotational axis CL side, the oil passage structure of the forward clutch oil passage 29 is simplified. However, if the forward clutch oil passage 29 is formed at a location way from the clutch rotational axis CL, the oil passage structure of the forward clutch oil passage 29 into which an oil passage outlet 29a opens at an inside location of the clutch oil chamber 28 becomes complex. In contrast, by forming the forward clutch oil passage 29 on a fixing plate member 31 with an L-shaped cross-section, the forward clutch oil passage 29 can be formed easily, even if the electric oil pump 18 is positioned at a location away from the clutch rotational axis CL.

In the first embodiment, the plate member on which is formed the forward clutch oil passage 29 is a fixing plate member 31 that maintains the fixed state regardless of the rotation of the drive system. For example, if the forward clutch oil passage 29 is formed on a rotating member, the centrifugal pump effect acts on the oil which flows inside the forward clutch oil passage 29, thus preventing oil from flowing in a direction toward the clutch rotational axis CL. In contrast, by forming the forward clutch oil passage 29 on the fixing plate member 31, the centrifugal pump effect does not act on the oil that flows inside the forward clutch oil passage 29; therefore, oil can flow smoothly in a direction toward the clutch rotational axis CL.

Oil Cooling Effect of the Forward Clutch

For example, when traveling forward, the forward clutch 14 is in a full engagement state, and the clutch temperature is low, the flow: step S1→step S2→step S4 in the flowchart of FIG. 3 is repeated. That is, the electric oil pump 18 is placed in a stopped state in step S4.

On the other hand, when starting, etc., the forward clutch 14 is in a slip-engaged state, and the clutch temperature is high due to the generation of frictional heat, the flow: step S1→step S2→step S3 in the flowchart of FIG. 3 is repeated. That is, the electric oil pump 18 is placed in an activated state in step S3.

In this manner, in the first embodiment, a configuration is implemented to carry out a control operation to actuate the electric motor 25 of the electric oil pump 18, when the temperature of the forward clutch 14 is at a predetermined temperature or higher. In other words, by carrying out a control operation to set the application of the electric oil pump 18 for the purpose of cooling the forward clutch 14, a small pump having the capacity to ensure the amount of cooling oil can be used as the electric oil pump 18. In addition, since the system configuration omits check valves, it is cost-effective.

Next, the effects are described. The effects listed below can be obtained by means of the clutch hydraulic system for a vehicle of the first embodiment.

(1) In a clutch hydraulic system for a vehicle comprising: a mechanical oil pump 17 actuated by a rotary drive shaft (transmission input shaft 8) of a drive system (FF-hybrid drive system); an electric oil pump 18 actuated by an electric oil pump 25 independent of the mechanical oil pump 17; a clutch (forward clutch 14) provided to the drive system (FF-hybrid drive system), which operates the mechanical oil pump 17 and the electric oil pump 18 as a hydraulic power source for the clutch (forward clutch 14); and a control valve unit 19 for providing engagement oil pressure and lubricating oil pressure to the clutch (forward clutch 14) based on a pump discharge pressure from the hydraulic power source; a main pump oil passage 26 leading from the mechanical oil pump 17 is connected to the control valve unit 19, and a sub-pump oil passage 27 leading from the electric oil pump 18 is connected to a clutch oil passage (forward clutch oil passage 29) into which an oil passage outlet 29a opens at an inside location closer to a clutch rotational axis CL than a clutch oil chamber 28 of the clutch (forward clutch 14) (FIG. 2). Accordingly, the need to provide a backflow prevention mechanism can be eliminated, when installing two oil pumps (mechanical oil pump 17, electric oil pump 18) as a hydraulic power source.

(2) A sub-pump oil passage 27 leading from the electric oil pump 18 is connected to an output oil passage 30 leading from the control valve unit 19, and the clutch oil passage (forward clutch oil passage 29) is connected on the downstream side of the connection position of the two oil passages 27, 30 (FIG. 2). Accordingly, in addition to the effect of (1), a flow toward the outlet side of the clutch oil passage (forward clutch oil passage 29) can be ensured by preventing backflow to the electric oil pump 18 side, whether the electric oil pump 18 is being operated or is stopped.

(3) The clutch oil passage (forward clutch oil passage 29) is formed on an L-shaped plate member (fixing plate member 31) comprising a radial plate portion 31a disposed in a side position of the clutch (forward clutch 14), and an axial extension portion 31b, which enters an interior region of the clutch (forward clutch 14) from the clutch rotational axis CL side end of the radial plate portion 31a (FIG. 1). Accordingly, in addition to the effect of (1) or (2), the clutch oil passage (forward clutch oil passage 29) can be formed easily, even if the electric oil pump 18 is positioned at a location away from the clutch rotational axis CL.

(4) The plate member is a fixing plate member 31 that maintains the fixed state regardless of the rotation of the drive system (FIG. 1). Accordingly, in addition to the effect of (3), the centrifugal pump effect does not act on the oil that flows inside the clutch oil passage (forward clutch oil passage 29); therefore, oil can flow smoothly in a direction toward the clutch rotational axis CL.

(5) The embodiment comprises a clutch temperature detection means (clutch temperature sensor 32) for detecting a temperature of the clutch (forward clutch 14); and a clutch cooling control means (CVT controller 20) for actuating an electric motor 25 of the electric oil pump 18, when the temperature of the clutch (forward clutch 14) is at a predetermined temperature or higher (FIG. 2). Accordingly, in addition to the effects of (1)-(4), while achieving a system which is cost-effective by reducing the size of the electric oil pump 18 and omitting check valves, deterioration in the durability of the clutch (forward clutch 14) caused by an increase in temperature can be prevented, by oil-cooling the clutch (forward clutch 14) when generating heat.

The clutch hydraulic system for a vehicle of the present invention was described above based on the first embodiment, however specific configurations thereof are not limited to the first embodiment, and various modifications and additions to the design can be made without departing from the scope of the invention according to each claim in the Claims.

In the first embodiment, an example was shown in which the electric oil pump 18 is reduced in size by using the discharge oil only for cooling the forward clutch 14. However, the electric oil pump may also be used for controlling the clutch hydraulic pressure instead of the mechanical oil pump.

In the first embodiment, an example was shown in which the clutch hydraulic system for a vehicle of the present invention is applied to an FF-hybrid drive system. However, the clutch hydraulic system for a vehicle of the present invention may also be applied to an FR-hybrid drive system or an engine drive system and the like. In short, the invention may be applied to any clutch hydraulic system for a vehicle equipped with two oil pumps as the hydraulic power source.

The invention claimed is:

1. A vehicle clutch hydraulic system for a vehicle, comprising:
 a mechanical oil pump configured to be actuated by a rotary drive shaft of a drive system;
 an electric oil pump configured to be actuated by an electric motor independent of actuation of the mechanical oil pump;
 a clutch configured to be disposed in the drive system, the clutch being operated by hydraulic pressure supplied from the mechanical oil pump and the electric oil pump as a hydraulic power source for the clutch;
 a control valve unit configured to provide engagement oil pressure and lubricating oil pressure to the clutch based on a pump discharge pressure from the hydraulic power source;
 a main pump oil passage fluidly connecting the mechanical oil pump to the control valve unit; and
 a sub-pump oil passage fluidly connecting the electric oil pump to a clutch oil passage arranged to supply hydraulic oil to a clutch oil chamber of the clutch, the clutch oil passage being formed inside an L-shaped plate member and including a first radial oil passage portion and an axial oil passage portion, the first radial oil passage portion extending in a radial direction of the clutch and being connected to the sub-pump oil passage, the axial oil passage portion extending toward the clutch in an axial direction of the clutch from a radially inward end of the first radial oil passage portion, the clutch oil passage further including an oil passage outlet that opens at a radially inward location closer to a clutch rotational axis than the clutch oil chamber.

2. The vehicle clutch hydraulic system according to claim 1, wherein the sub-pump oil passage is fluidly connected to an output oil passage leading from the control valve unit, and the clutch oil passage is fluidly connected on a downstream side of a connection position of the sub-pump oil passage and the output oil passage.

3. The vehicle clutch hydraulic system according to claim 2, wherein the L-shaped plate member includes a radial plate portion disposed in a side position of the clutch, and an axial extension portion that enters an interior region of the clutch from a clutch rotational axis side end of the radial plate portion, the first radial oil passage portion being disposed in the radial plate portion and the axial oil passage portion being disposed in the axial extension portion.

4. The vehicle clutch hydraulic system according to claim 3, further comprising a clutch temperature sensor configured to detect a temperature of the clutch; and a clutch cooling controller programmed to actuate the electric motor of the electric oil pump, upon the clutch temperature sensor detecting a temperature of the clutch is at a predetermined temperature or higher.

5. The vehicle clutch hydraulic system according to claim 2, further comprising a clutch temperature sensor configured to detect a temperature of the clutch; and a clutch cooling controller programmed to actuate the electric motor of the electric oil pump, upon the clutch temperature sensor detecting a temperature of the clutch is at a predetermined temperature or higher.

6. The vehicle clutch hydraulic system according to claim 1, wherein the L-shaped plate member includes a radial plate portion disposed in a side position of the clutch, and an axial extension portion that enters an interior region of the clutch from a clutch rotational axis side end of the radial plate portion, the first radial oil passage portion being disposed in the radial plate portion and the axial oil passage portion being disposed in the axial extension portion.

7. The vehicle clutch hydraulic system according to claim 6, wherein the plate member is a fixing plate member that maintains a fixed state regardless of a rotation of the drive system.

8. The vehicle clutch hydraulic system according to claim 7, further comprising a clutch temperature sensor configured to detect a temperature of the clutch; and a clutch cooling controller programmed to actuate the electric motor of the electric oil pump, upon the clutch temperature sensor detecting a temperature of the clutch is at a predetermined temperature or higher.

9. The vehicle clutch hydraulic system according to claim 6, further comprising a clutch temperature sensor configured to detect a temperature of the clutch; and a clutch cooling controller programmed to actuate the electric motor of the electric oil pump, upon the clutch temperature sensor detecting a temperature of the clutch is at a predetermined temperature or higher.

10. A vehicle clutch hydraulic system for a vehicle, comprising:

a mechanical oil pump configured to be actuated by a rotary drive shaft of a drive system;

an electric oil pump configured to be actuated by an electric motor independent of actuation of the mechanical oil pump;

a clutch configured to be disposed in the drive system, the clutch being operated by hydraulic pressure supplied from the mechanical oil pump and the electric oil pump as a hydraulic power source for the clutch;

a control valve unit configured to provide engagement oil pressure and lubricating oil pressure to the clutch based on a pump discharge pressure from the hydraulic power source;

a main pump oil passage fluidly connecting the mechanical oil pump to the control valve unit; and a sub-pump oil passage fluidly connecting the electric oil pump to a clutch oil passage having an oil passage outlet that opens at a radially inward location closer to a clutch rotational axis than a clutch oil chamber of the clutch, the clutch oil passage supplying hydraulic oil to the clutch oil chamber;

a clutch temperature sensor configured to detect a temperature of the clutch; and a clutch cooling controller programmed to actuate the electric motor of the electric oil pump upon the clutch temperature sensor detecting a temperature of the clutch is at a predetermined temperature or higher.

* * * * *